US012802616B2

(12) United States Patent
Bae et al.

(10) Patent No.: US 12,802,616 B2
(45) Date of Patent: Nov. 17, 2026

(54) CONTROLLER FOR PREVENTING AFTERIMAGE WHEN ENTERING LOW FREQUENCY DISPLAY MODE, METHOD OF DRIVING THE CONTROLLER, AND DISPLAY DEVICE INCLUDING THE CONTROLLER

(71) Applicant: Samsung Display Co., LTD., Yongin-si (KR)

(72) Inventors: Jong Man Bae, Yongin-si (KR); Hyun Su Kim, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 131 days.

(21) Appl. No.: 18/633,953

(22) Filed: Apr. 12, 2024

(65) Prior Publication Data

US 2025/0124850 A1 Apr. 17, 2025

(30) Foreign Application Priority Data

Oct. 13, 2023 (KR) ........................ 10-2023-0137090

(51) Int. Cl.
*G09G 3/30* (2006.01)
*G09G 3/32* (2016.01)
*G09G 3/36* (2006.01)

(52) U.S. Cl.
CPC ....... *G09G 3/32* (2013.01); *G09G 2300/0842* (2013.01); *G09G 2340/0435* (2013.01)

(58) Field of Classification Search
CPC ............. G09G 3/32; G09G 2300/0435; G09G 2300/0842; G09G 2310/08; G09G 2320/0257; G09G 2370/10
See application file for complete search history.

(56) References Cited

U.S. PATENT DOCUMENTS

| | | | | |
|---|---|---|---|---|
| 9,607,562 B2 | 3/2017 | Kim et al. | | |
| 9,858,854 B2 | 1/2018 | Seo et al. | | |
| 10,971,077 B2 | 4/2021 | Kwon et al. | | |
| 2014/0204269 A1* | 7/2014 | Sugiyama | H04N 5/06 | 348/512 |
| 2020/0082760 A1* | 3/2020 | Ogata | G09G 3/3258 | |
| 2021/0248980 A1* | 8/2021 | Lee | G09G 5/12 | |
| 2023/0298524 A1* | 9/2023 | Cho | G09G 3/3225 | 345/691 |

FOREIGN PATENT DOCUMENTS

| | | |
|---|---|---|
| KR | 20210016123 A | 2/2021 |
| KR | 102246262 B1 | 4/2021 |
| KR | 102390273 B1 | 4/2022 |

* cited by examiner

*Primary Examiner* — Sanghyuk Park
(74) *Attorney, Agent, or Firm* — CANTOR COLBURN LLP

(57) ABSTRACT

A controller includes a reception interface configured to receive first frame data and a first vertical synchronization packet, and a transmission interface configured to transmit a first frame request signal, where when a first period from a time point when the reception interface completes reception of the first frame data to a time point when the reception interface starts reception of the first vertical synchronization packet is longer than a first reference period, the transmission interface transmits the first frame request signal.

33 Claims, 12 Drawing Sheets

CONTROLLER FOR PREVENTING AFTERIMAGE WHEN ENTERING LOW FREQUENCY DISPLAY MODE, METHOD OF DRIVING THE CONTROLLER, AND DISPLAY DEVICE INCLUDING THE CONTROLLER

This application claims priority to Korean Patent Application No. 10-2023-0137090, filed on Oct. 13, 2023, and all the benefits accruing therefrom under 35 U.S.C. § 119, the content of which in its entirety is herein incorporated by reference.

BACKGROUND

1. Field

The invention relates to a processor, a controller including the same, a method of driving the controller, and a display device including the controller.

2. Description of the Related Art

As information technology develops, the importance of a display device, which is a connection medium between a user and information, has been highlighted. In response to this, the use of a display device such as a liquid crystal display device and an organic light emitting display device is increasing.

The display device may display an image at a high frequency or display an image at a low frequency, as needed. For example, when displaying a moving image, an image may be displayed at a high frequency, and when displaying a still image or in a standby state, an image may be displayed at a low frequency.

When entering a display mode of a low frequency from a display mode of a high frequency, due to a hysteresis characteristic of a driving transistor in a pixel, an afterimage of a previous image may remain, and thus undesirable display may occur.

SUMMARY

The invention includes a controller capable of preventing an afterimage when entering a display mode of a low frequency even though the controller does not include a separate frame memory. Additionally, the invention includes a method of driving the controller and a display device including the controller.

According to an embodiment, a controller includes a reception interface configured to receive first frame data and a first vertical synchronization packet, and a transmission interface configured to transmit a first frame request signal, and when a first period from a time point when the reception interface completes reception of the first frame data to a time point when the reception interface starts reception of the first vertical synchronization packet is longer than a first reference period, the transmission interface transmits the first frame request signal.

In an embodiment, the controller may transit the first frame request signal after a time point when reception of second frame data next to the first frame data is completed.

In an embodiment, the first frame data and the second frame data may be different image data.

In an embodiment, when the first frame request signal is transmitted, the controller may receive a second vertical synchronization packet.

In an embodiment, the controller may receive third frame data after receiving the second vertical synchronization packet, and the third frame data and the second frame data may be the same image data.

In an embodiment, the controller may transmit a second frame request signal after a time point when reception of the third frame data is completed.

In an embodiment, a second period from the time point when reception of the second frame data is completed to a time point when reception of the second vertical synchronization packet is started may be shorter than the first period.

In an embodiment, a third period from the time point when reception of the third frame data is completed to a time point when reception of a third vertical synchronization packet is started may be the same as the second period.

In an embodiment, when the first period is shorter than the first reference period and longer than a second reference period, the reception interface of the controller may further receive a plurality of frame data, and when the first period is shorter than the first reference period and the number of frames longer than the second reference period matches the number of reference frames, the transmission interface may transmit the first frame request signal after a time point when reception of second frame data, which is the last of the plurality of frame data, is completed.

In an embodiment, the plurality of frame data may be different image data.

In an embodiment, when the first frame request signal is transmitted, the controller may receive a second vertical synchronization packet.

In an embodiment, the controller may receive third frame data after receiving the second vertical synchronization packet, and the third frame data and the second frame data may be the same image data.

In an embodiment, the controller may transit a second frame request signal after a time point when reception of the third frame data is completed.

In an embodiment, a second period from the time point when reception of the second frame data is completed to a time point when reception of the second vertical synchronization packet is started may be shorter than the first period.

In an embodiment, a third period from the time point when reception of the third frame data is completed to a time point when reception of a third vertical synchronization packet is started may be the same as the second period.

In an embodiment, the controller may further include a first register storing the first reference period, a second register storing the second reference period, and a third register storing the number of transmissions of a frame request signal.

In an embodiment, the first frame request signal and the second frame request signal may be transmitted based on the number of transmissions stored in the third register, and the number of transmissions may be 2 or more.

According to an embodiment, a method of driving a controller may include receiving first frame data, receiving a first vertical synchronization packet, and transmitting a first frame request signal when a first period from a time point when reception of the first frame data is completed to a time point when reception of the first vertical synchronization packet is started is longer than a first reference period.

In an embodiment, the controller may transit the first frame request signal after a time point when reception of second frame data next to the first frame data is completed.

In an embodiment, the first frame data and the second frame data may be different image data.

In an embodiment, when the first frame request signal is transmitted, the controller may receive a second vertical synchronization packet.

In an embodiment, the controller may receive third frame data after receiving the second vertical synchronization packet, and the third frame data and the second frame data may be the same image data.

In an embodiment, the controller may transmit a second frame request signal after a time point when reception of the third frame data is completed.

In an embodiment, a second period from the time point when reception of the second frame data is completed to a time point when reception of the second vertical synchronization packet is started may be shorter than the first period.

In an embodiment, a third period from the time point when reception of the third frame data is completed to a time point when reception of a third vertical synchronization packet is started may be the same as the second period.

In an embodiment, when the first period is shorter than the first reference period and longer than a second reference period, the reception interface of the controller may further receive a plurality of frame data, and when the first period is shorter than the first reference period and the number of frames longer than the second reference period matches the number of reference frames, the transmission interface may transmit the first frame request signal after a time point when reception of second frame data, which is the last of the plurality of frame data, is completed.

In an embodiment, the plurality of frame data may be different image data.

In an embodiment, when the first frame request signal is transmitted, the controller may receive a second vertical synchronization packet.

In an embodiment, the controller may receive third frame data after receiving the second vertical synchronization packet, and the third frame data and the second frame data may be the same image data.

In an embodiment, the controller may transit a second frame request signal after a time point when reception of the third frame data is completed.

In an embodiment, a second period from a time point when reception of the second frame data is completed to a time point when reception of the second vertical synchronization packet is started may be shorter than the first period.

In an embodiment, a third period from the time point when reception of the third frame data is completed to a time point when reception of a third vertical synchronization packet is started may be the same as the second period.

According to an embodiment, a display device may include a processor configured to transmit first frame data and a first vertical synchronization packet, a controller configured to generate data voltages corresponding to the first frame data, and a pixel unit configured to display an image based on the data voltages, and the controller may transmit a first frame request signal to the processor when a first period from a time point when reception of the first frame data is completed to a time point when reception of the first vertical synchronization packet is started is longer than a first reference period.

In an embodiment, the controller, the method of driving the controller, and the display device including the controller according to the disclosure may prevent an afterimage when entering a display mode of a low frequency even though the controller does not include a separate frame memory.

BRIEF DESCRIPTION OF THE DRAWINGS

The above and other features of the invention will become more apparent by describing in further detail embodiments thereof with reference to the accompanying drawings, in which.

DETAILED DESCRIPTION

Figure 1A:
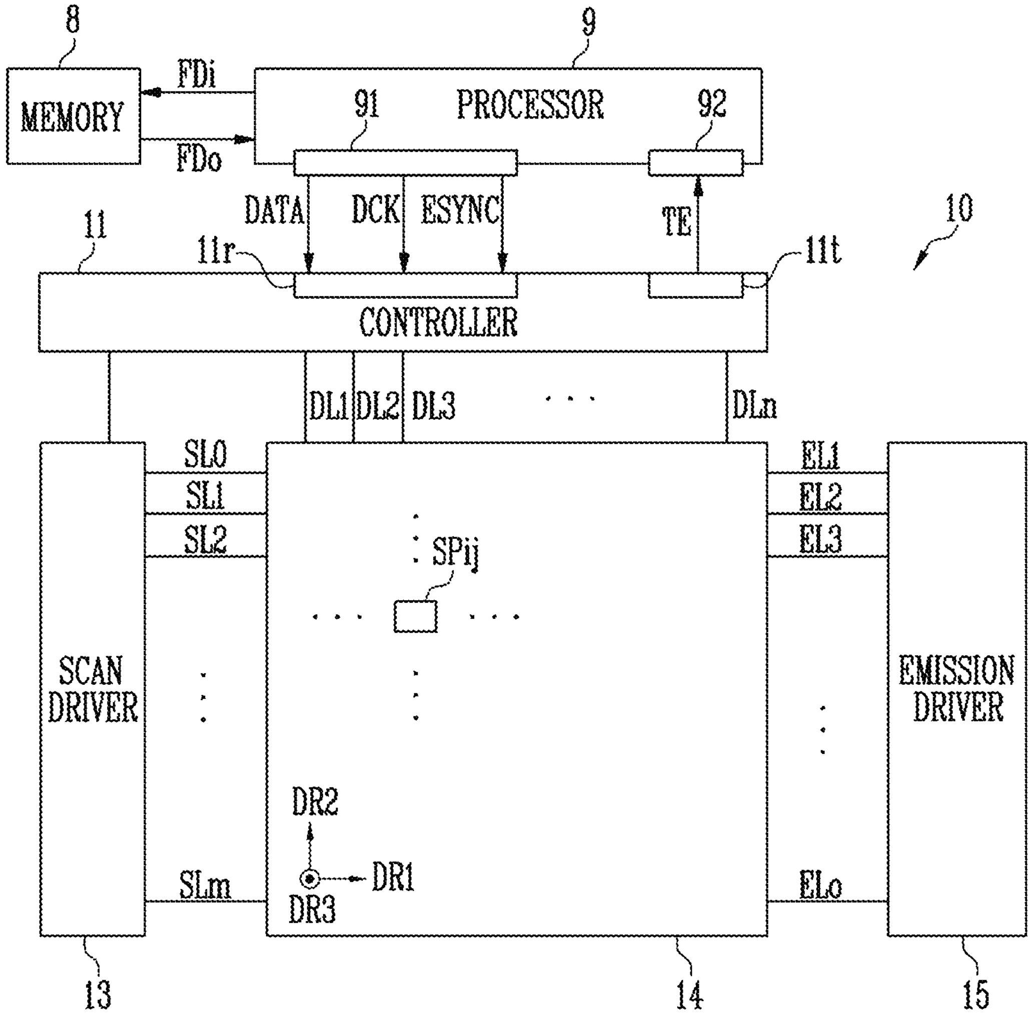
FIG. 1A is a schematic block diagram illustrating a display device, according to an embodiment.

Hereinafter, various embodiments of the invention will be described in detail with reference to the accompanying drawings so that those skilled in the art may easily carry out the invention. The invention may be implemented in various different forms and is not limited to the embodiments described herein.

In order to clearly describe the invention, parts that are not related to the description are omitted, and the same or similar elements are denoted by the same reference numerals throughout the specification. Therefore, the above-described reference numerals may be used in other drawings.

In addition, sizes and thicknesses of each component shown in the drawings are arbitrarily shown for convenience of description, and thus the invention is not necessarily limited to those shown in the drawings. In the drawings, thicknesses may be exaggerated to clearly express various layers and areas.

In addition, an expression "is the same" in the description may mean "is substantially the same". That is, the expression "is the same" may be the same enough for those of ordinary skill to understand that it is the same. Other expressions may also be expressions in which "substantially" is omitted.

Throughout the specification, unless explicitly described to the contrary, the word "comprise" and variations such as "comprises" or "comprising" will be understood to imply the inclusion of stated elements but not the exclusion of any other elements. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms first, second, etc. may be used herein to describe various constituent elements, these constituent elements should not be limited by these terms. These terms are used to distinguish one constituent element from another constituent element. Thus, a first constituent element discussed below could be termed a second constituent element without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the term "below" can encompass both an orientation of above and below. Furthermore, the apparatus may be otherwise oriented (for example, rotated 90 degrees or at other orientations), and, as such, the spatially relative descriptors used herein interpreted accordingly.

Various embodiments may be described herein with reference to sectional illustrations that are schematic illustrations of idealized embodiments. As such, variations from the shapes of the illustrations as a result, for example, of manufacturing techniques and/or tolerances, are to be expected. Thus, embodiments disclosed herein should not be construed as limited to the particular illustrated shapes of regions, but are to include deviations in shapes that result from, for instance, manufacturing. Thus, the regions illustrated in the drawings are schematic in nature and their shapes are not intended to illustrate the actual shape of a region of a device and are not intended to be limiting.

Like numbers refer to like elements throughout. In the drawings, the thickness of certain lines, layers, components, elements or features may be exaggerated for clarity. It will be understood that, although the terms "first", "second", etc. may be used herein to describe various elements, these elements should not be limited by these terms. These terms are only used to distinguish one element from another element. Thus, a "first" element discussed below could also be termed a "second" element without departing from the teachings of the invention.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items.

Hereinafter, embodiments of the invention will be described in detail with reference to the accompanying drawings.

Figure 1B:
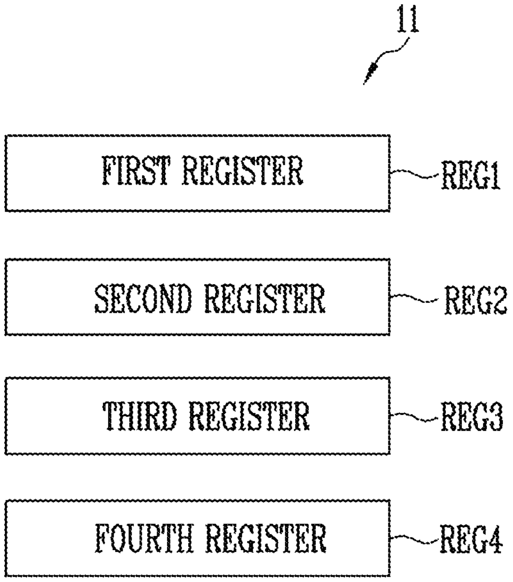
FIG. 1B is a schematic block diagram illustrating a display device, according to an embodiment.

FIGS. 1A and 1B are diagrams illustrating a display device, according to an embodiment.

Referring to FIG. 1A, the display device 10, according to an embodiment, may include a memory 8, a processor 9, a controller 11, a scan driver 13, a pixel unit 14, and an emission driver 15.

In an embodiment, the processor 9 may include a transmission interface 91 and a reception interface 92. For example, the transmission interface 91 may transmit data DATA, a data clock DCK, and a synchronization signal ESYNC.

In an embodiment, the data DATA may include frame data and vertical synchronization packets. The data DATA may further include horizontal synchronization packets. The frame data may be image data. The vertical synchronization packet may be a control packet informing that transmission of current frame data is ended and transmission of next frame data is to be started. The horizontal synchronization packet may be a control packet informing that transmission of a current horizontal line among a plurality of horizontal lines configuring an image is ended and transmission of a next horizontal line is to be started. Meanwhile, the horizontal synchronization packet may be continuously provided also at a time point when the frame data is not transmitted.

In an embodiment, the data clock DCK may be a clock signal for informing a transmission unit of the data DATA. The controller 11 may sample the data DATA based on the data clock DCK. Meanwhile, the data clock DCK may be embedded in the data DATA. In this case, the controller 11 may extract the data clock DCK from the data DATA using a clock recovery circuit. In this case, the processor 9 may not separately provide the data clock DCK.

In an embodiment, the synchronization signal ESYNC may be a signal for synchronization between the processor 9 and the controller 11. For example, a cycle of the synchronization signal ESYNC may be the same as a cycle of the horizontal synchronization packet. That is, the cycle of the synchronization signal ESYNC may correspond to one horizontal period. When synchronization is unnecessary or another synchronization signal exists, the synchronization signal ESYNC may be omitted.

In an embodiment, the reception interface 92 may receive a frame request signal TE. At least a portion of the transmission interface 91 and the reception interface 92 may have a standard defined by a mobile industry processor interface (MIPI).

In an embodiment, the processor 9 may include a graphics processing unit therein. The graphics processing unit may generate (or render) the frame data FDi corresponding to an image. In another embodiment, the processor 9 may be connected to an external graphics processing unit. The processor 9 may be an application processor (AP) or a central processing unit (CPU).

In an embodiment, the memory 8 may store the frame data FDi generated by the processor 9 or the graphics processing unit. The frame data FDi may be image data on which rendering is being progressed. That is, the frame data FDi may be image data on which rendering is not completed. Meanwhile, the memory 8 may provide pre-stored frame data FDo according to a request of the processor 9. For example, the frame data FDo may be image data of a past time point of the frame data FDi, and may be image data on which rendering is completed. For example, when the frame data FDi is an N-th image data, the frame data FDo may be an (N−1)-th image data. N may be an integer greater than 1.

In an embodiment, the frame data may include grayscales for each pixel. For example, the grayscales may include a first color grayscale for expressing a first color, a second color grayscale for expressing a second color, and a third color grayscale for expressing a third color.

In an embodiment, the controller 11 may the receive data DATA, the data clock DCK, and the synchronization signal ESYNC from the processor 9, and may transmit a frame request signal TE in some cases. As described above, according to an embodiment, a configuration of the data clock DCK and the synchronization signal ESYNC may be omitted.

In an embodiment, the controller 11 may include a reception interface 11*r* for receiving the frame data and the vertical synchronization packets, and a transmission interface 11*t* for transmitting the frame request signal TE.

In an embodiment, the frame request signal TE may be a signal through which the controller 11 requests the frame data FDo to the processor 9. When the processor 9 receives the frame request signal TE, the processor 9 may cancel a scheduled schedule and provide the frame data FDo. The frame data FDo may be the latest frame data on which rendering is completed among data stored in the memory 8. When the processor 9 receives the frame request signal TE, the processor 9 may first provide the vertical synchronization packet, and then provide the frame data FDo.

For example, in an embodiment, when the controller 11 senses that a display frequency of an image decreases from a high frequency to a low frequency, the controller 11 may transmit the frame request signal TE according to a predefined reference. The frame request signal TE may be repeatedly transmitted at a high frequency. Accordingly, an image corresponding to the frame data FDo may be repeatedly displayed at a high frequency. Therefore, by repeatedly displaying an image at a high frequency before displaying an image at a low frequency, an afterimage phenomenon due to a hysteresis characteristic may be prevented. When entering a low frequency driving of the display device 10, a function of inserting frames to repeatedly display an image at a high frequency may be referred to as a frame insertion function.

In an embodiment and referring to FIG. 1B, the controller 11 may include a plurality of registers REG1, REG2, REG3, and REG4 for storing setting values for the frame insertion function. For example, the first register REG1 may store mode information, the second register REG2 may store a first reference period, the third register REG3 may store frequency information, and the fourth register REG4 may store the number of transmissions of the frame request signal TE. A description of the registers REG1, REG2, REG3, REG4 refers to a description of FIGS. 4A to 5 described later. For reference, more registers may be added in other embodiments. The controller 11 may sample grayscales for each pixel from the data DATA based on the data clock DCK. The controller 11 may convert grayscales, which are digital signals, into data voltages, which are analog voltages. In addition, the controller 11 may generate control signals for writing the data voltages to the pixel unit 14 and provide the control signals to the scan driver 13 and the emission driver 15. However, according to a structure of the pixel, the emission driver 15 may be omitted.

In an embodiment, the controller 11 may apply the data voltages to data lines DLI to DLn in a pixel row unit (or a horizontal line unit). The letter "n" may be an integer greater than 0. A pixel row may refer to sub-pixels connected to the same scan lines and emission lines.

In an embodiment, the scan driver 13 may generate scan signals to be provided to scan lines SL0, SL1, SL2, . . . , and SLm by receiving the clock signal, the scan start signal, and the like from the controller 11. For example, the scan driver 13 may sequentially provide scan signals having a turn-on level of pulse to the scan lines SL1 to SLm. For example, the scan driver 13 may be configured in a form of a shift register, and may generate the scan signals in a method of sequentially transferring a scan start signal of a form of a turn-on level of pulse to a next stage circuit under control of the clock signal. The letter "m" may be an integer greater than 0.

In an embodiment, the emission driver 15 may generate emission signals to be provided to emisson lines EL1, EL2, EL3, . . . , and ELo by receiving the clock signal, the emisson stop signal, and the like from the controller 11. For example, the emission driver 15 may sequentially provide emission signals having a turn-off level of pulse to the emisson lines EL1 to ELo. For example, the emission driver 15 may be configured in a form of a shift register and may generate emission signals in a method of sequentially transferring an emission stop signal in a form of a turn-off level of pulse to a next stage circuit under control of the clock signal. The letter "o" may be an integer greater than 0.

In an embodiment, the pixel unit 14 includes pixels. Each pixel may include a plurality of sub-pixels. For example, one pixel may include a first sub-pixel that emits light in a first color, a second sub-pixel that emits light in a second color, and a third sub-pixel that emits light in a third color. According to an embodiment, each pixel may include only two sub-pixels, and may display an image by sharing the sub-pixels with an adjacent pixel.

In an embodiment, each sub-pixel SPij may be connected to corresponding data line, scan line, and emission line. Each of i and j may be an integer greater than 0. The sub-pixel SPij may refer to a sub-pixel in which a scan transistor is connected to an i-th scan line and a j-th data line.

In an embodiment, the first color, the second color, and the third color may be different colors. For example, the first color may be one of red, green, and blue, the second color may be one other than the first color among red, green, and blue, and the third color may be one other than the first color and the second color among red, green, and blue. In addition, magenta, cyan, and yellow may be used instead of red, green, and blue as the first to third colors. However, in an embodiment, for convenience of description, it is assumed that the first color is red, the second color is green, and the third color is blue.

In an embodiment, the pixel unit 14 may be disposed in various shapes such as diamond PENTILE™, RGB-Stripe, S-stripe, Real RGB, and normal PENTILE™.

In an embodiment, it is assumed that the sub-pixels of the pixel unit 14 are arranged in a first direction DR1 and a second direction DR2 which is perpendicular to the first direction DR1. In addition, it is assumed that an emission direction of the sub-pixels is a third direction DR3 is directed perpendicular to the first direction DR1 and the second direction DR2.

Figure 2:
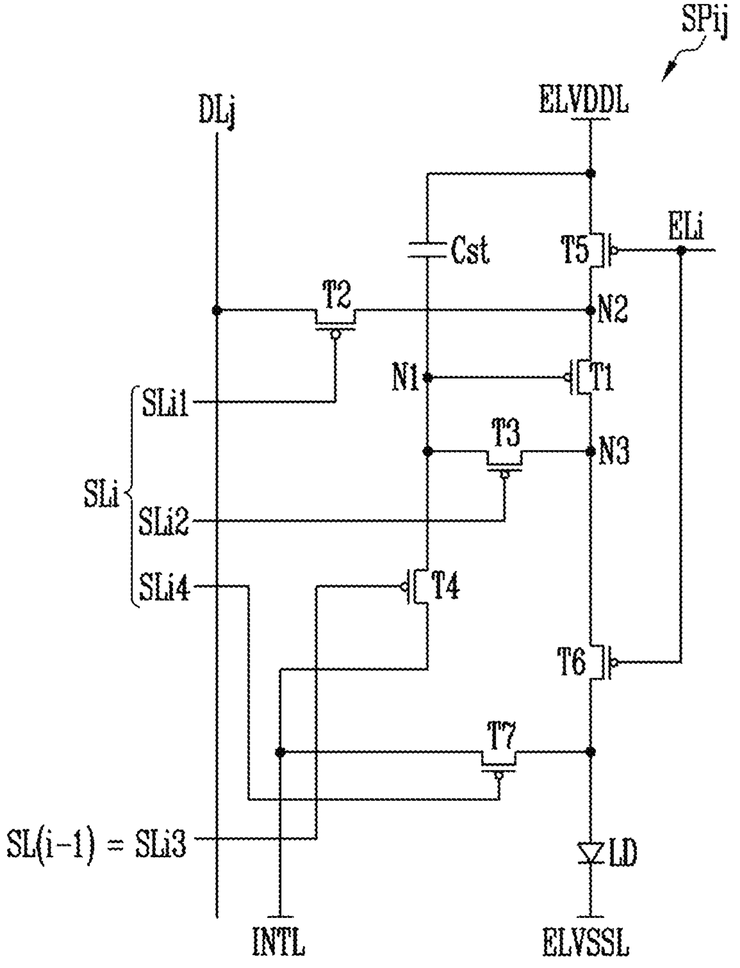
FIG. 2 is a schematic circuit diagram illustrating a sub-pixel, according to an embodiment.

FIG. 2 is a diagram illustrating a sub-pixel, according to an embodiment.

In an embodiment and referring to FIG. 2, a sub-pixel SPij includes transistors T1, T2, T3, T4, T5, T6, and T7, a storage capacitor Cst, and a light emitting element LD.

Hereinafter, an embodiment of a circuit configured of a P-type transistor is described as an example. However, in another embodiment, those skilled in the art will be able to design a circuit configured of an N-type transistor by differentiating a polarity of a voltage applied to a gate terminal. Similarly, those skilled in the art will be able to design a circuit configured of a combination of a P-type transistor and an N-type transistor. The P-type transistor is collectively referred to as a transistor in which a current amount increases when a voltage difference between a gate electrode and a source electrode increases in a negative direction. The N-type transistor is collectively referred to as a transistor in which a current amount increases when a voltage difference between a gate electrode and a source electrode increases in a positive direction. The transistor may be configured in various forms such as a thin film transistor (TFT), a field effect transistor (FET), and a bipolar junction transistor (BJT).

In an embodiment, the first transistor T1 may have a gate electrode connected to a first node N1, a first electrode connected to a second node N2, and a second electrode connected to a third node N3. The first transistor T1 may be referred to as a driving transistor.

In an embodiment, the second transistor T2 may have a gate electrode connected to a scan line SLi1, a first electrode connected to a data line DLj, and a second electrode connected to the second node N2. The second transistor T2 may be referred to as a scan transistor.

In an embodiment, the third transistor T3 may have a gate electrode connected to a scan line SLi2, a first electrode connected to the first node N1, and a second electrode connected to the third node N3. The third transistor T3 may be referred to as a diode connection transistor.

In an embodiment, the fourth transistor T4 may have a gate electrode connected to a scan line SLi3, a first electrode connected to the first node N1, and a second electrode connected to an initialization line INTL. The fourth transistor T4 may be referred to as a gate initialization transistor.

In an embodiment, the fifth transistor T5 may have a gate electrode connected to an i-th emission line Eli, a first electrode connected to a first power line ELVDDL, and a second electrode connected to the second node N2. The fifth transistor T5 may be referred to as an emission transistor. In another embodiment, the gate electrode of the fifth transistor T5 may be connected to an emission line different from an emission line connected to a gate electrode of the sixth transistor T6.

In an embodiment, the sixth transistor T6 may have the gate electrode connected to the i-th emission line ELi, a first electrode connected to the third node N3, and a second electrode connected to an anode of the light emitting element LD. The sixth transistor T6 may be referred to as an emission transistor. In another embodiment, the gate electrode of the sixth transistor T6 may be connected to an emission line different from the emission line connected to the gate electrode of the fifth transistor T5.

In an embodiment, the seventh transistor T7 may have a gate electrode connected to a scan line SLi4, a first electrode connected to the initialization line INTL, and a second electrode connected to the anode of the light emitting element LD. The seventh transistor T7 may be referred to as a light emitting element initialization transistor.

In an embodiment, a first electrode of the storage capacitor Cst may be connected to the first power line ELVDDL and a second electrode may be connected to the first node N1.

In an embodiment, the anode of the light emitting element LD may be connected to the second electrode of the sixth transistor T6 and a cathode may be connected to a second power line ELVSSL. The light emitting element LD may be a light emitting diode. The light emitting element LD may be configured of an organic light emitting element (organic light emitting diode), an inorganic light emitting element (inorganic light emitting diode), a quantum dot/well light emitting element (quantum dot/well light emitting diode), or the like. Although only one light emitting element LD is provided in each pixel in the present embodiment, a plurality of light emitting elements may be provided in each pixel in another embodiment. At this time, the plurality of light emitting elements may be connected in series, parallel, series-parallel, or the like. The light emitting element LD of each sub-pixel SPij may emit light in one of the first color, the second color, and the third color.

In an embodiment, the first power line ELVDDL may be supplied with a first power voltage, the second power line ELVSSL may be supplied with a second power voltage, and the initialization line INTL may be supplied with an initialization voltage. In an embodiment, the first power voltage may be greater than the second power voltage. In an embodiment, the initialization voltage may be equal to or greater than the second power voltage. In an embodiment, the initialization voltage may correspond to a data voltage of the smallest size among data voltages corresponding to the output grayscales. In another embodiment, the size of the initialization voltage may be less than sizes of the data voltages corresponding to the color grayscales.

Figure 3:
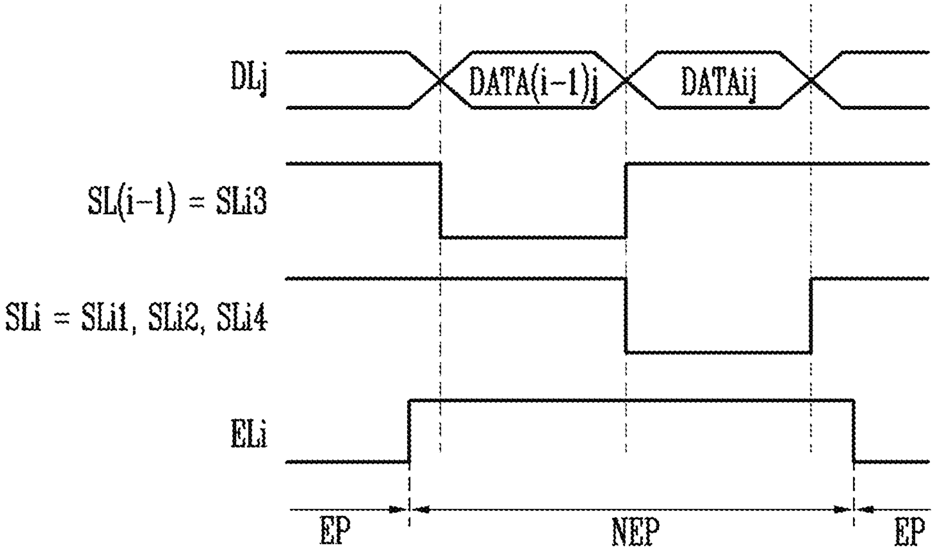
FIG. 3 is a timing diagram illustrating a method of driving the sub-pixel of FIG. 2, according to an embodiment.

FIG. 3 is a diagram illustrating a method of driving the sub-pixel of FIG. 2, according to an embodiment.

Hereinafter, for convenience of description, it is assumed that the scan lines SLi1, SLi2, and SLi4 are i-th scan lines SLi and the scan line SLi3 is an (i−1)-th scan line SL(i−1). However, a connection relationship of the scan lines SLi1, SLi2, SLi3, and SLi4 may be various according to embodiments. For example, the scan line SLi4 may be the (i−1)-th scan line or an (i+1)-th scan line.

In an embodiment, an emission signal of a turn-off level (logic high level) is applied to the i-th emission line ELi, a data voltage DATA(i−1)j for an (i−1)-th sub-pixel is applied to the data line DLj, and a scan signal of a turn-on level (logic low level) is applied to the scan line SLi3. The high/low of the logic level may vary according to whether a transistor is a P-type or an N-type.

In an embodiment, since a scan signal of a turn-off level is applied to the scan lines SLi1 and SLi2, the second transistor T2 is turned off, and the data voltage DATA(i−1)j for the (i−1)-th sub-pixel is prevented from being input to the i-th sub-pixel SPij.

In an embodiment, since the fourth transistor T4 is turned on, the first node N1 is connected to the initialization line INTL, and thus a voltage of the first node N1 is initialized. Since the emission signal of the turn-off level is applied to the emission line ELi, the transistors T5 and T6 are turned off, and unnecessary light emission of the light emitting element LD according to an initialization voltage application process is prevented.

In an embodiment, a data voltage DATAij for the i-th sub-pixel PXij is applied to the data line DLj, and the scan signal of the turn-on level is applied to the scan lines SLi1 and SLi2. Accordingly, the transistors T2, T1, and T3 are turned on, and the data line DLj and the first node N1 are electrically connected with each other. Therefore, a compensation voltage obtained by subtracting a threshold voltage of the first transistor T1 from the data voltage DATAij is applied to the second electrode of the storage capacitor Cst (that is, the first node N1), and the storage capacitor Cst maintains a voltage corresponding to a difference between the first power voltage and the compensation voltage. Such a period may be referred to as a threshold voltage compensation period or a data writing period.

In addition, in an embodiment, when the scan line SLi4 is the i-th scan line, since the seventh transistor T7 is turned on, the anode of the light emitting element LD and the initialization line INTL are connected with each other, and the light emitting element LD is initialized to a charge amount corresponding to a voltage difference between the initialization voltage and the second power voltage.

In an embodiment, as the emission signal of the turn-on level is applied to the i-th emission line ELi, the transistors T5 and T6 may be turned on. Therefore, a driving current path connecting the first power line ELVDDL, the fifth transistor T5, the first transistor T1, the sixth transistor T6, the light emitting element LD, and the second power line ELVSSL is formed.

In an embodiment, a driving current amount flowing to the first electrode and the second electrode of the first transistor T1 is adjusted according to the voltage maintained in the storage capacitor Cst. The light emitting element LD emits light with a luminance corresponding to the driving current amount. The light emitting element LD emits light until the emission signal of the turn-off level is applied to the emission line Ei.

In an embodiment, when the emission signal is the turn-on level, sub-pixels receiving the corresponding emission signal may be in a display state. Therefore, a period in which the emission signal is the turn-on level may be referred to as an emission period EP (or an emission allowable period). In addition, when the emission signal is the turn-off level, sub-pixels receiving the corresponding emission signal may be in a non-display state. Therefore, a period in which the emission signal is the turn-off level may be referred to as a non-emission period NEP (or an emission disallowable period).

In an embodiment, the non-emission period NEP described with reference to FIG. 3 is for preventing the sub-pixel SPij from emitting light with an undesired luminance during the initialization period and the data writing period.

In an embodiment, one or more non-emission periods NEP may be additionally provided while data written to the sub-pixel SPij is maintained (for example, one frame period). This may be for effectively expressing a low gray-scale by reducing the emission period EP of the sub-pixel SPij, or for smoothly blurring a motion of an image.

Figure 4A:
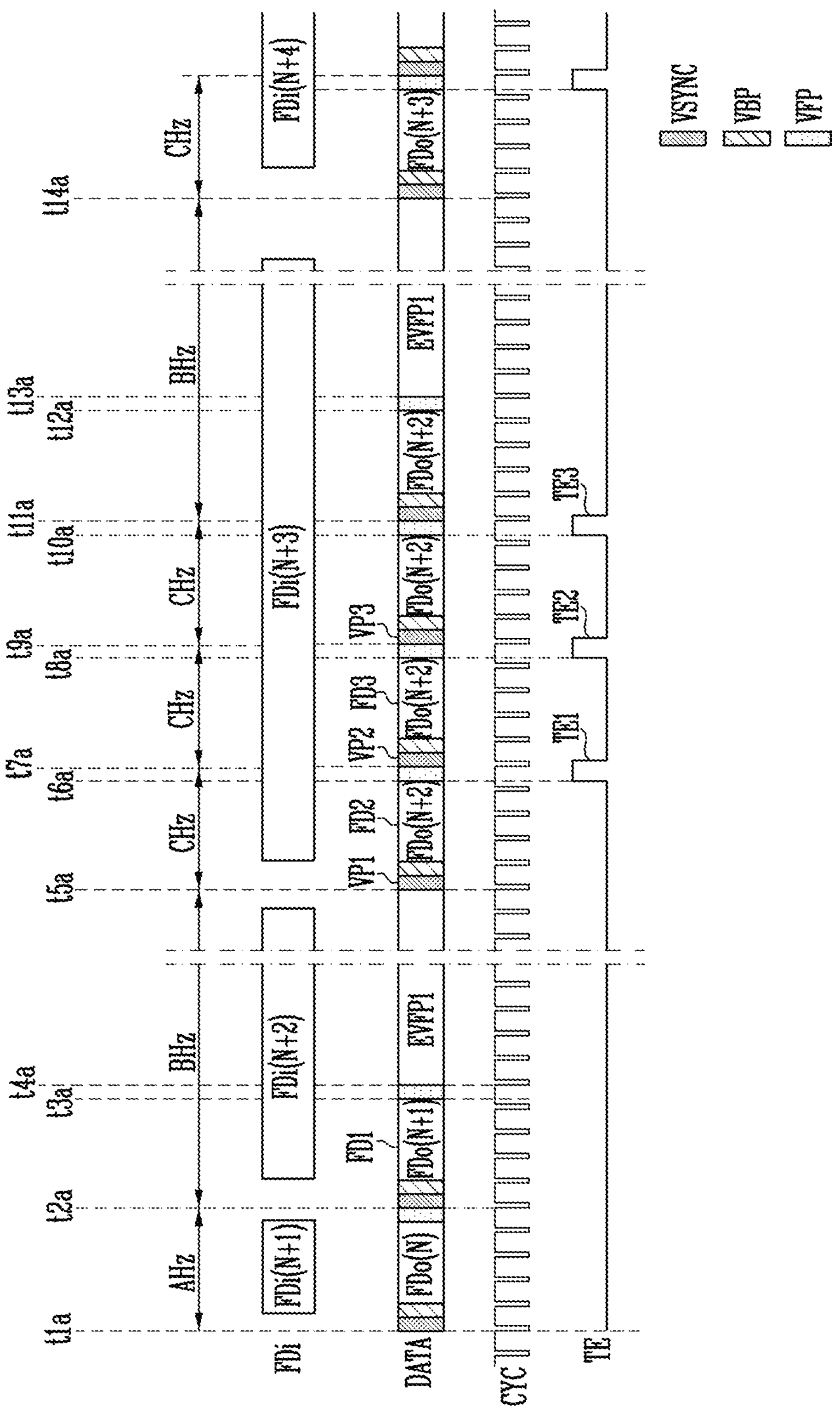
FIG. 4A is a timing diagram illustrating a method of driving a display device, according to an embodiment.
Figure 4B:
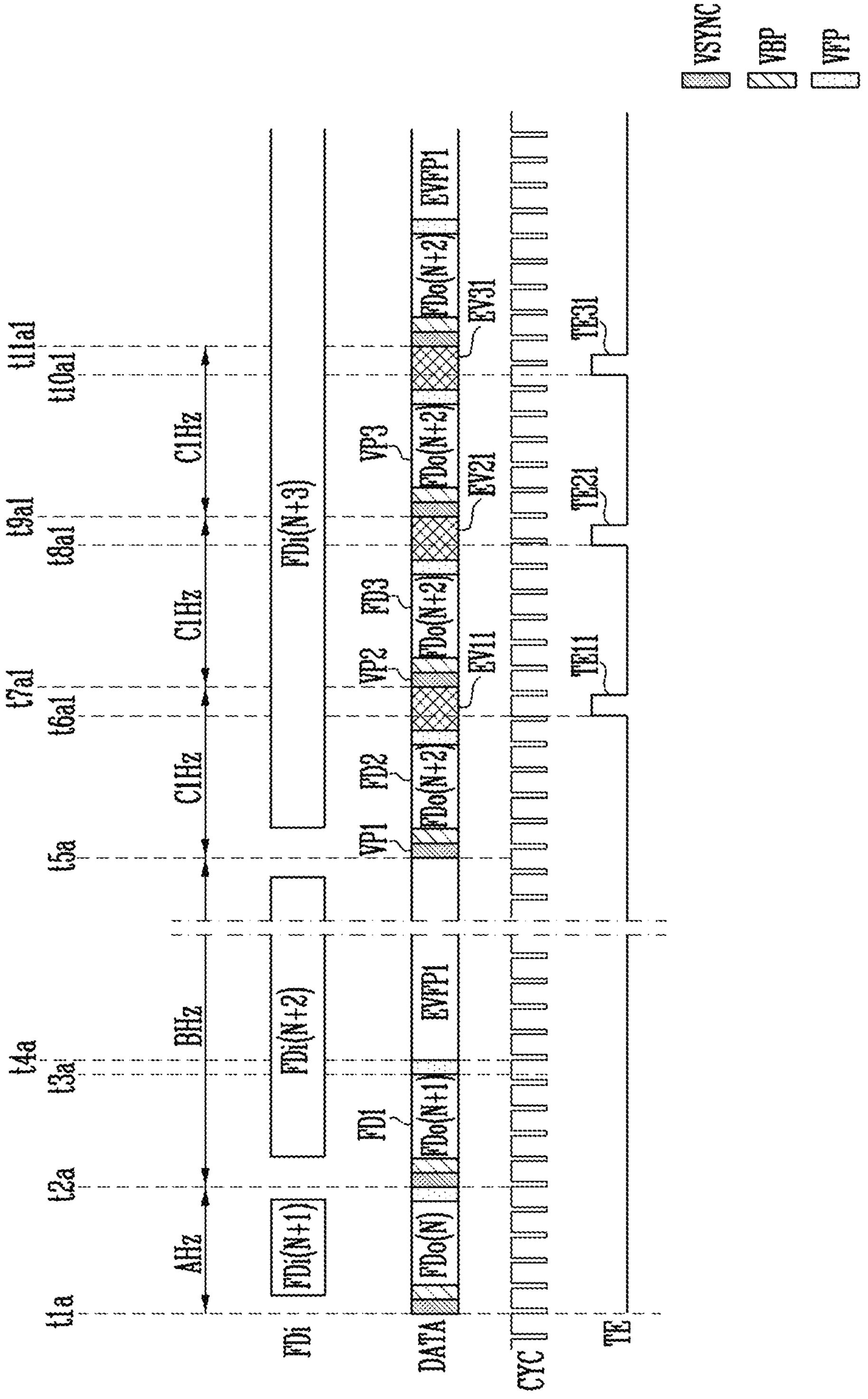
FIG. 4B is a timing diagram illustrating a method of driving a display device, according to an embodiment.
Figure 4C:
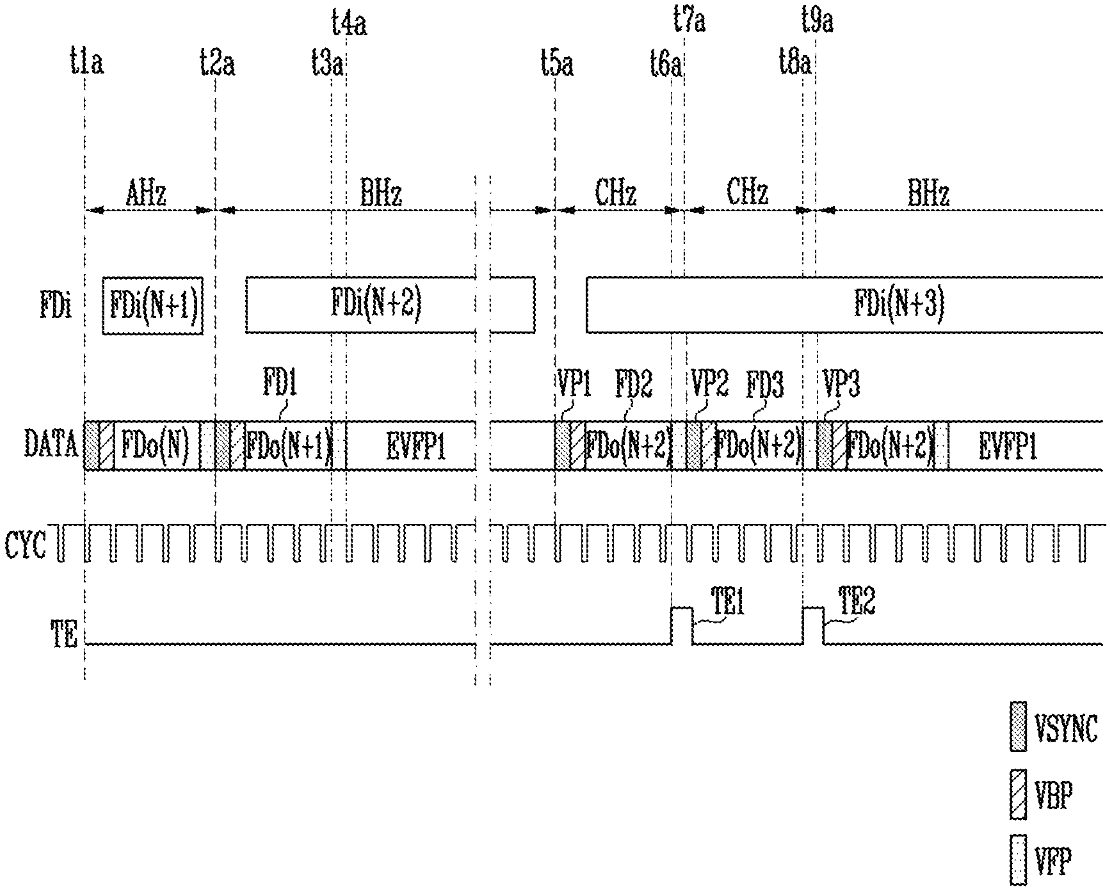
FIG. 4C is a timing diagram illustrating a method of driving a display device, according to an embodiment.
Figure 4D:
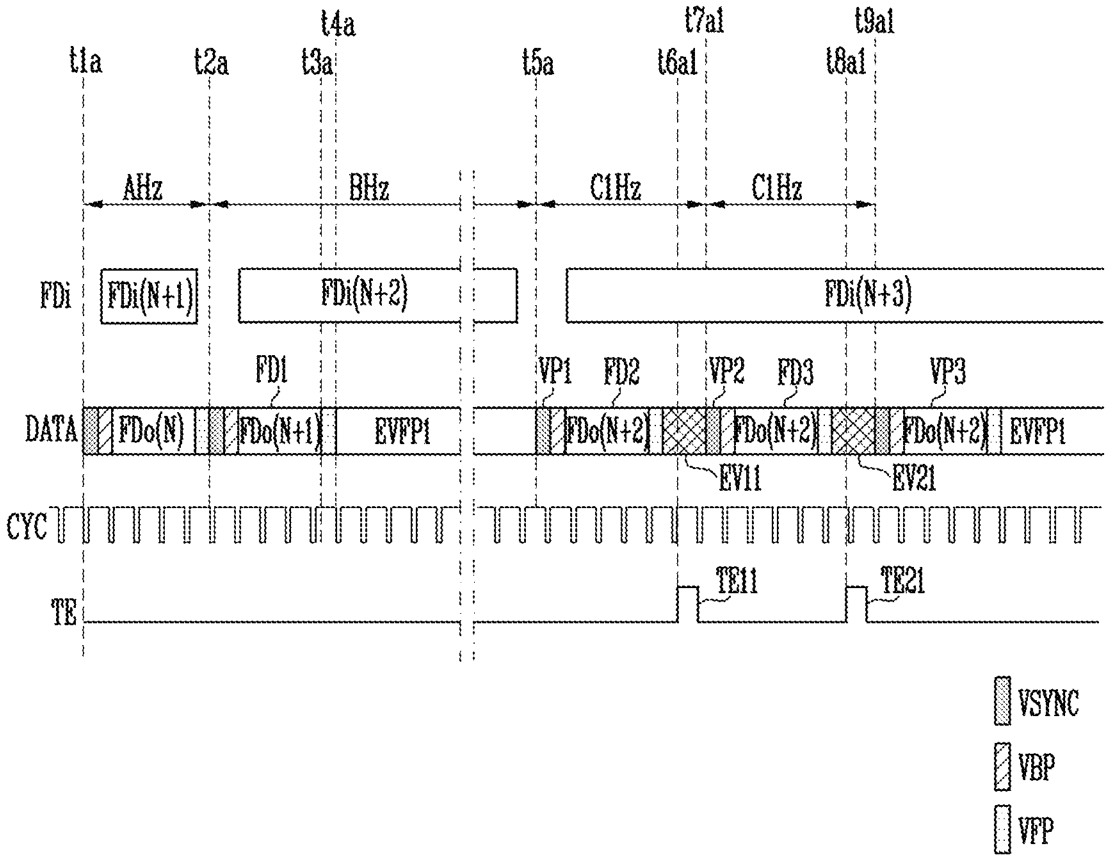
FIG. 4D is a timing diagram illustrating a method of driving a display device, according to an embodiment.
Figure 5:
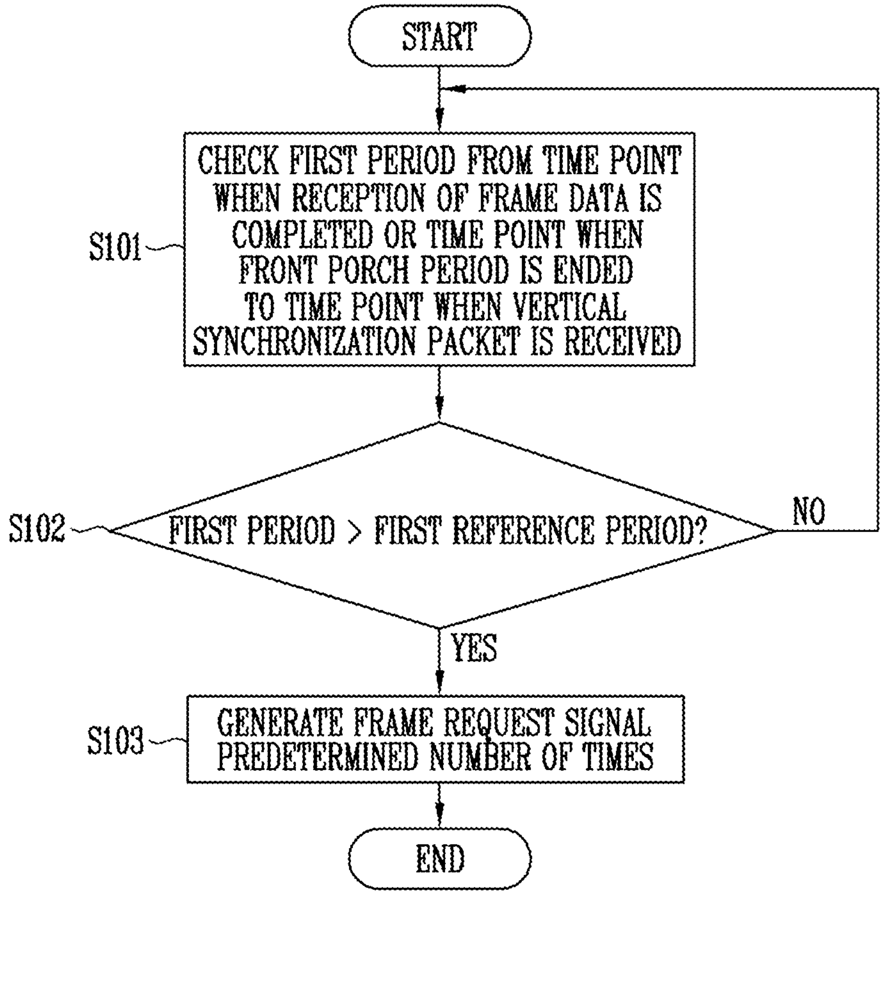
FIG. 5 is a block diagram illustrating a method of driving a display device, according to an embodiment.

FIGS. 4A to 5 are timing diagrams illustrating a method of driving a display device, according to an embodiment.

In an embodiment and referring to a time line of FIG. 4A, rendering periods of the frame data FDi, the data DATA output from the processor 9, an operation clock CYC of the controller 11, and the frame request signal TE output from the controller 11 are shown.

In an embodiment and referring to FIG. 1B again and FIG. 4A, the first register REG1 may store information indicating a first mode as mode information. The second register REG2 may store 13'd31 as a first reference period. 13'd31 may be data indicating that a cycle of the operation clock CYC is repeated 31 times in data of 13 bit capacity. At this time, the first reference period may be a period corresponding to about 20 Hz and may be approximately 50 ms. The third register REG3 may store information indicating that a frequency CHz is about 144 Hz as frequency information. The fourth register REG4 may store information corresponding to 3 as the number of transmissions of the frame request signal TE.

In an embodiment, during a frame period t1*a* to t2*a*, the processor 9 may sequentially transmit a vertical synchronization packet VSYNC and frame data FDo(N) to display an image at a high frequency AHz. One frame period may correspond to a transmission cycle of the vertical synchronization packet VSYNC. A back porch period VBP and a front porch period VFP may indicate periods between a transmission period of the vertical synchronization packet VSYNC and a transmission period of the frame data FDo(N) other than a specific packet. A length of the front porch period VFP and a length of the back porch period VBP may be predefined. In another embodiment, the processor 9 may transmit packets corresponding to the back porch period VBP and the front porch period VFP. In an embodiment and referring to FIG. 4A, the high frequency AHz is shown assuming that the high frequency AHz is a maximum frequency at which the processor 9 may operate. However, the high frequency AHz may be less than the maximum frequency at which the processor 9 may operate, and in this case, an extension front porch period, which will be described later, may exist between the front porch period VFP and the vertical synchronization packet VSYNC.

In an embodiment, it is assumed that the processor 9 enters a low frequency display mode from a high frequency display mode from a time point t2*a*. For example, it is assumed that the processor 9 generates and transmits an image at a low frequency BHz from the time point t2*a*. At this time, the processor 9 does not transmit additional information informing a frequency change to the controller 11. The processor 9 may adjust a rendering speed of the image according to a frequency. For example, a speed of generating frame data FDi(N+2) during a period t2*a* to t5*a* operating at the low frequency BHz may be less than a speed of generating frame data FDi(N+1) during a period t1*a* to t2*a* operating at the high frequency AHz.

In an embodiment, during the frame period t2*a* to t5*a*, the processor 9 may sequentially transmit the vertical synchronization packet VSYNC and frame data FDo(N+1). The frame data FDo(N+1) may be the same image data as the frame data FDi(N+1).

In an embodiment, at this time, the controller 11 may check a first period t3*a* to t5*a* or t4*a* to t5*a* from a time point t3*a* when reception of first frame data FD1 is completed or an end time point t4*a* of the front porch period VFP to a time point t5*a* when reception of the first vertical synchronization packet VP1 is started (see S101 of FIG. 5). In an example of FIG. 4A, the first frame data FD1 may be the frame data FDo(N+1). While the processor 9 generates the frame data FDi(N+2) during a low frequency operation period, the previous frame data FDo(N+1) generated in a period t1*a* to t2*a* may be transmitted and output to the controller 11.

In an embodiment, the controller 11 may know a length of an extension front porch period EVFP1 by counting a repeated cycle of the operation clock CYC during the extension front porch period EVFP1. For example, the operation clock CYC may be a signal synchronized with the synchronization signal ESYNC, and may have a cycle longer than that of the synchronization signal ESYNC. For example, one cycle of the operation clock CYC may be equal to about 400 cycles of the synchronization signal ESYNC.

In an embodiment, the controller 11 may determine whether the first period (or the extension front porch period EVFP1) is longer than the first reference period (see S102 of FIG. 5). The first reference period may be predefined. For example, the first reference period may be predefined to be the same as the first period of a case where the display frequency is about 20 Hz. For example, as described above, the second register REG2 may store 13'd31 as the first reference period. 13'd31 may be data indicating that the cycle of the operation clock CYC is repeated 31 times in data of 13 bit capacity. Therefore, the controller 11 may determine that the first period is longer than the first reference period when the cycle of the operation clock CYC is repeated more than 31 times. The first reference period may be a reference for checking whether the display device 10 is driven at a low frequency (here, about 20 Hz or less).

Hereinafter, for convenience of description, a case where a range of the high frequency AHz is greater than about 40 Hz and equal to or less than about 144 Hz is described as an example. In an embodiment, a case where a range of the low frequency BHz is equal to or less than about 20 Hz is described as an example. A case where an intermediate frequency DHz described later is greater than about 20 Hz and equal to or less than about 40 Hz is described as an example (refer to FIG. 6). Therefore, in an example of FIG. 4A, the controller 11 may determine that the first period t3*a* to t5*a* or t4*a* to t5*a* is longer than the first reference period.

In an embodiment, the controller 11 may generate and transmit the frame request signal TE to the processor 9 a predetermined number of times (see S103 of FIG. 5). For example, the fourth register REG4 may store information corresponding to 3 as the number of transmissions of the frame request signal TE. Therefore, in FIG. 4A, a case where the frame request signal TE is transmitted three times t6*a*, t8*a*, and t10*a* is described as an example.

In an embodiment, the controller 11 may transmit a first frame request signal TE1 after a time point toa when reception of second frame data FD2 next to the first frame data FD1 is completed. The first frame data FDo(N+1) and second frame data FDo(N+2) may be different image data. For example, the controller 11 may transmit the first frame request signal TE1 during a front porch period t6*a* to t7*a* after the time point t6*a* when reception of the second frame data FD2 is completed. That is, when the controller 11 determines that the first period is greater than the first reference period, the controller 11 may determine that the frame insertion function is required to be applied and transmit the first frame request signal TE1 in a next frame. When the processor 9 receives the first frame request signal TE1, the processor 9 may transmit a second vertical synchronization packet VP2.

In an embodiment, a second period toa to t7*a* from the time point toa when reception of the second frame data FD2 is completed to a time point t7*a* when reception of the second vertical synchronization packet VP2 is started may be shorter than a corresponding first period t3*a*~t5*a*. That is, the frequency CHz of a frame period t5*a* to t7*a* in which the frame insertion function is performed may be greater than the low frequency BHz. The frequency CHz may be the maximum frequency at which the processor 9 may operate. The frequency CHz may be a maximum value of the range of the high frequency AHZ. Accordingly, an image corresponding to the frame data FDo(N+2) may be repeatedly displayed at a high frequency CHz. Therefore, by repeatedly displaying the image at the high frequency before displaying the image at the low frequency BHz after a time point t11*a*, an afterimage phenomenon due to a hysteresis characteristic may be prevented.

In an embodiment, the processor 9 may transmit third frame data FD3 after transmitting the second vertical synchronization packet VP2. Since rendering of next frame data FDi(N+3) is not completed in the processor 9, the third frame data FDo(N+2) and the second frame data FDo(N+2) may be the same image data.

In an embodiment, the controller 11 may transmit a second frame request signal TE2 after a time point t8*a* when reception of the third frame data FD3 is completed.

In an embodiment, a third period t8*a* to t9*a* from a time point t8*a* when reception of the third frame data FD3 is completed to a time point 19*a* when reception of a third vertical synchronization packet VP3 is started may be the same as the second period toa to t7*a*.

In an embodiment, the controller 11 may transmit a frame request signal TE3 once more at a time point t10*a*. The number of transmissions of the frame request signal TE may be determined in advance. Accordingly, in an embodiment, the frame insertion function may be performed repeatedly three times t5*a* to t7*a*, t7*a* to t9*a*, and 19*a* to t11*a* during a period t5*a* to t11*a*.

In an embodiment, the controller 11 may not transmit the frame request signal TE at a time point t12*a* when reception of the frame data FDo(N+2) is completed. Accordingly, the extension front porch period EVFP1 may occur after a time point t13*a*, and thus the pixel unit 14 may display the image at the low frequency BHz. Since a time after a time point t14*a* overlaps a time after the time point t5*a*, an additional description is omitted.

The present embodiment may be variously modified by changing the settings values stored in the registers REG1, REG2, REG3, REG4, . . . .

In an embodiment and referring to FIG. 4B, in the third register REG3, a case where a frequency C1 Hz for the frame insertion function is set to be less than the high frequency AHz of the period t1*a* to t2*a* is shown. For example, the high frequency AHz may be 144 Hz, and the set frequency C1 Hz may be 120 Hz. In this case, after receiving the second frame data FD2, an extension front porch period EV11 may occur between the front porch period VFP and the second vertical synchronization packet VP2. At this time, a first frame request signal TE11 may occur during the extension front porch period EV11. According to a generation timing of the first frame request signal TE11, an inserted frame period t5*a* to t7*al* may be set to correspond to the frequency C1 Hz. Similarly, a second frame request signal TE21 may occur during an extension front porch period EV21. A third frame request signal TE31 may occur during an extension front porch period EV31.

In an embodiment and referring to FIG. 4C, the frequency CHz set in the third register REG3 may be set equal to the high frequency AHz. However, in the present embodiment, it is assumed that information corresponding to 2 is stored in the fourth register REG4 as the number of transmissions of the frame request signal TE. Therefore, it may be confirmed that the frame request signals TEL and TE2 are transmitted only twice.

In an embodiment and referring to FIG. 4D, a case where the frequency C1 Hz in the third register REG3 is set to be less than the high frequency AHz of the period t1*a* to t2*a* and information corresponding to 2 is stored in the fourth register REG4 as the number of transmissions of the frame request signal TE is shown.

Figure 6:
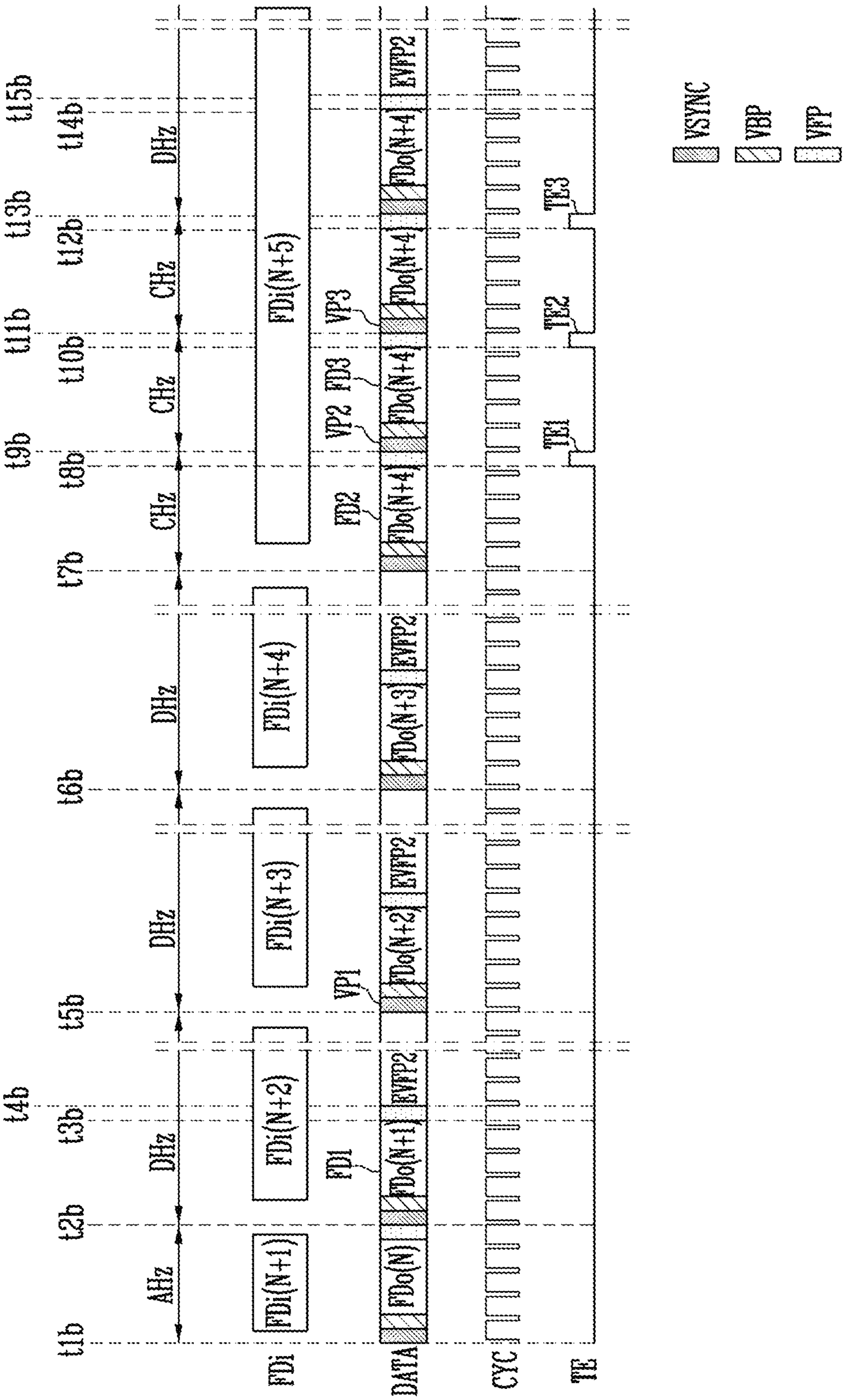
FIG. 6 is a timing diagram illustrating a method of driving a display device, according to an embodiment.
Figure 7:
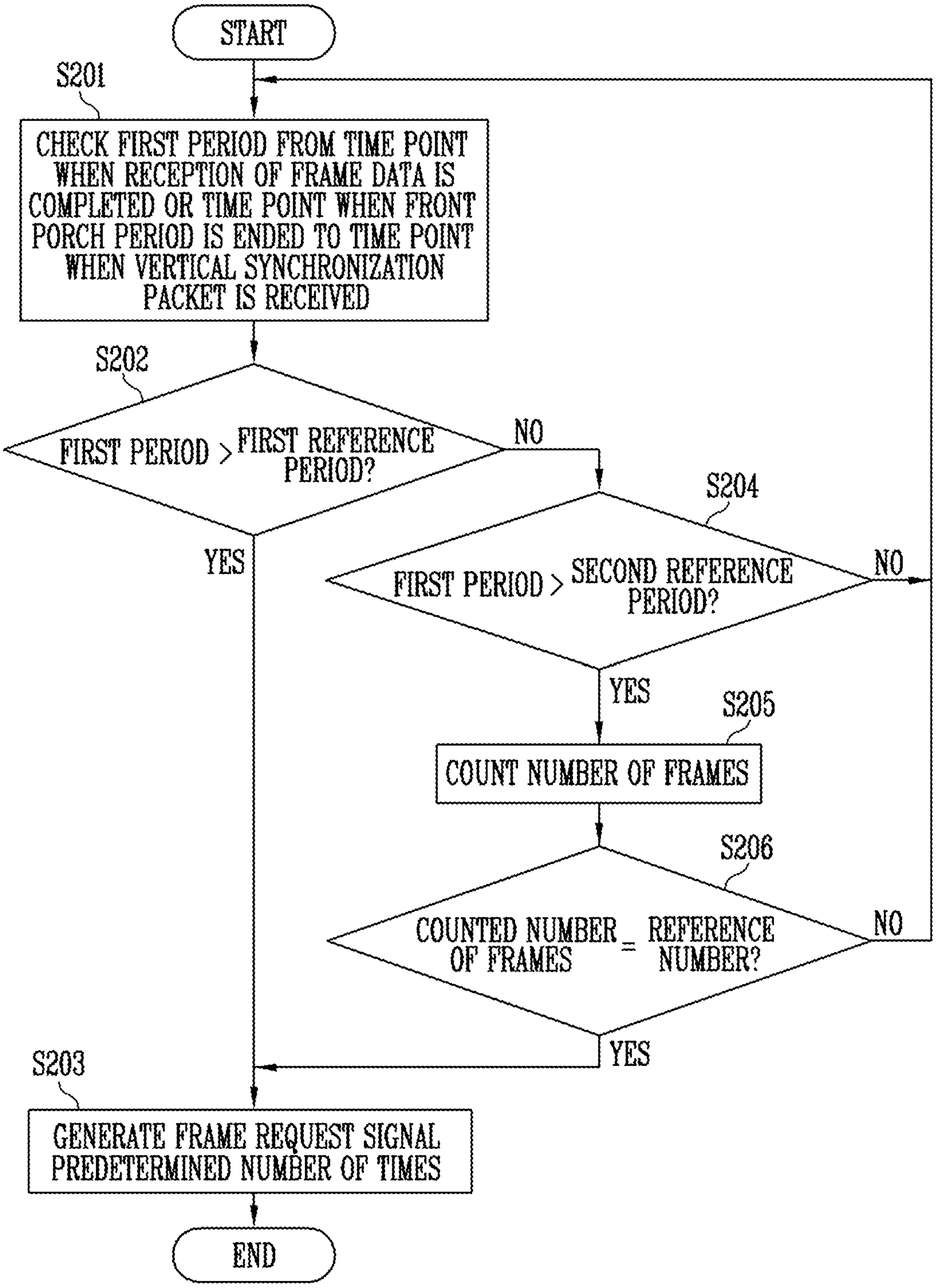
FIG. 7 is a block diagram illustrating a method of driving a display device, according to an embodiment.

FIGS. 6 and 7 are diagrams illustrating a method of driving a display device, according to embodiments.

In an embodiment and referring to a time line of FIG. 6, rendering periods of the frame data FDi, the data DATA output from the processor 9, an operation clock CYC of the controller 11, and the frame request signal TE output from the controller 11 are shown.

In an embodiment and referring to FIG. 1B again and FIG. 6, the first register REG1 may store information indicating a second mode as mode information. The second register REG2 may store 13'd31 as a first reference period, where 13'd31 may be data indicating that a cycle of the operation clock CYC is repeated 31 times in data of 13 bit capacity. At this time, the first reference period may be a period corresponding to about 20 Hz and may be approximately 50 ms. The third register REG3 may store information indicating that a frequency CHz is 144 Hz as frequency information.

The fourth register REG4 may store information corresponding to 3 as the number of transmissions of the frame request signal TE.

In addition, in an embodiment, the controller 11 may further include a fifth register and a sixth register. The fifth register may store information on a second reference period. For example, information on the second reference period may be 13'd13. 13'd13 may be data indicating that the cycle of the operation clock CYC is repeated 13 times in data of 13 bit capacity. At this time, the second reference period may be a period corresponding to about 40 Hz and may be approximately 25 ms. By using the first reference period and the second reference period, the second reference period may be a reference for confirming whether the display device 10 is driven at an intermediate frequency DHz (for example, greater than 20 Hz and equal to or less than 40 Hz).

In an embodiment, the sixth register may store information on the number of reference frames. For example, the information on the number of reference frames may be 4'd3. 4'd3 may be data indicating 3 frames in data of 4 bit capacity.

In an embodiment, during a frame period t1*b* to t2*b*, the processor 9 may sequentially transmit a vertical synchronization packet VSYNC and frame data FDo(N) to display an image at a high frequency AHz.

In an embodiment, it is assumed that the processor 9 enters an intermediate frequency display mode from a high frequency display mode from a time point t2*b*. For example, it is assumed that the processor 9 generates and transmits an image at the intermediate frequency DHz from the time point t2*b*. At this time, the processor 9 does not transmit additional information informing a frequency change to the controller 11. The processor 9 may adjust a rendering speed of the image according to a frequency. For example, a speed of generating frame data FDi(N+2) during a period t2*b* to t5*b* operating at the intermediate frequency DHz may be less than a speed of generating frame data FDi(N+1) during a period t1*b* to t2*b* operating at the high frequency AHz.

In an embodiment, during the frame period t2*b* to t5*b*, the vertical synchronization packet VSYNC and frame data FDo(N+1) may be sequentially transmitted. The frame data FDo(N+1) may be the same image data as the frame data FDi(N+1).

In an embodiment, the controller 11 may check a first period t3*b* to t5*b* or t4*b* to t5*b* from a time point t3*b* when reception of first frame data FD1 is completed or an end time point t4*b* of the front porch period to a time point t5*b* when reception of the first vertical synchronization packet VP1 is started (see S201 of FIG. 7). In an example of FIG. 6, the first frame data FD1 may be the frame data FDo(N+1).

In an embodiment, the controller 11 may know a length of an extension front porch period EVFP2 by counting a repeated cycle of the operation clock CYC during the extension front porch period EVFP2. For example, the operation clock CYC may be a signal synchronized with the synchronization signal ESYNC, and may have a cycle longer than that of the synchronization signal ESYNC. For example, a period in which one cycle of the operation clock CYC is progressed may be the same as a period in which 400 cycles of the synchronization signal ESYNC are repeated.

In an embodiment, the controller 11 may determine whether the first period (or the extension front porch period EVFP2) is longer than the first reference period (see S202 of FIG. 7). The first reference period may be predefined. For example, the first reference period may be predefined to be the same as the first period of a case where the display frequency is about 20 Hz.

In an embodiment and as described above, for convenience of description, a case where the intermediate frequency DHz is greater than about 20 Hz and equal to or less than about 40 Hz is described as an example. Therefore, in an example of FIG. 6, the controller 11 may determine that the extension front porch period EVFP2 is shorter than the first reference period.

In an embodiment, the controller 11 may determine whether the first period (or the extension front porch period EVFP2) is longer than the second reference period (See S204 of FIG. 7). The second reference period may be predefined. For example, the second reference period may be predefined to be the same as the first period of a case where the display frequency is about 40 Hz. Therefore, in the example of FIG. 6, the controller 11 may determine that the extension front porch period EVFP2 is longer than the second reference period. In an embodiment, the controller 11 may count the number of frames (see S205 in FIG. 7). At this time point, a count value may be 1. When the counted number of frames does not match the number of reference frames, the controller 11 may return to step S201 and repeat the above-described process (see S206 of FIG. 7). The number of reference frames may be predefined in the sixth register. For example, it is assumed that the number of reference frames is defined as 3.

In an embodiment, the controller 11 may further receive a plurality of frame data FDo(N+2), FDo(N+3), and FDo (N+4). When the number of frames t2*b* to t5*b*, t5*b* to t6*b*, and t6*b* to t7*b* in which the first period is shorter than the first reference period and longer than the second reference period matches the reference number (S206), the controller 11 may transmit the first frame request signal TE1 after a time point t8*b* when reception of the second frame data FD2, which is the last of the frame data FDo(N+2), FDo(N+3), and FDo (N+4).

In an embodiment, the controller 11 may generate and transmit the frame request signal TE to the processor 9 a predetermined number of times (see S203 of FIG. 7). In FIG. 6, a case where the frame request signal TE is transmitted three times t8*b*, t10*b*, and t12*b* is described as an example.

In an embodiment, the controller 11 may transmit a first frame request signal TE1 after a time point t8*b* when reception of second frame data FD2 is completed. The first frame data FDo(N+1) and second frame data FDo(N+4) may be different image data. For example, the controller 11 may transmit the first frame request signal TE1 during a front porch period t8*b* to t9*b* after the time point t8*b* when reception of the second frame data FD2 is completed.

In an embodiment, when the processor 9 receives the first frame request signal TE1, the processor 9 may transmit a second vertical synchronization packet VP2.

In an embodiment, a second period t8*b* to t9*b* from the time point t8*b* when reception of the second frame data FD2 is completed to a time point t9*b* when reception of the second vertical synchronization packet VP2 is started may be shorter than a corresponding first period t3*b*~t5*b*. That is, the frequency CHz of a frame period t7*b* to t9*b* in which the frame insertion function is performed may be greater than the intermediate frequency DHz. The frequency CHz may be the maximum frequency at which the processor 9 may operate. The frequency CHz may be a maximum value of the range of the high frequency AHz. Accordingly, an image corresponding to the frame data FDo(N+4) may be repeatedly displayed at a high frequency CHz. Therefore, by repeatedly displaying the image at the high frequency before displaying the image at the intermediate frequency DHz after a time point t13*b*, an afterimage phenomenon due to a hysteresis characteristic may be prevented.

In an embodiment, the processor 9 may transmit third frame data FD3 after transmitting the second vertical synchronization packet VP2. Since rendering of next frame data FDi(N+4) is not completed in the processor 9, the third frame data FDo(N+4) and the second frame data FDo(N+4) may be the same image data.

In an embodiment, the controller 11 may transmit a second frame request signal TE2 after a time point t10*b* when reception of the third frame data FD3 is completed.

In an embodiment, a third period t10*b* to t11*b* from a time point t10*b* when reception of the third frame data FD3 is completed to a time point t11*b* when reception of a third vertical synchronization packet VP3 is started may be the same as the second period t8*b* to t9*b*.

In an embodiment, t, the controller 11 may transmit a frame request signal TE3 once more at a time point t12*b*. The number of transmissions of the frame request signal TE may be determined in advance.

In an embodiment, the controller 11 may not transmit the frame request signal TE at a time point t14*b* when reception of the frame data FDo(N+4) is completed. Accordingly, the extension front porch period EVFP1 may occur after a time point t15*b*, and thus the pixel unit 14 may display the image at the intermediate frequency DHz. Since a time after the time point t15*b* overlaps a time after the time point t4*b*, an additional description is omitted.

Figure 8:
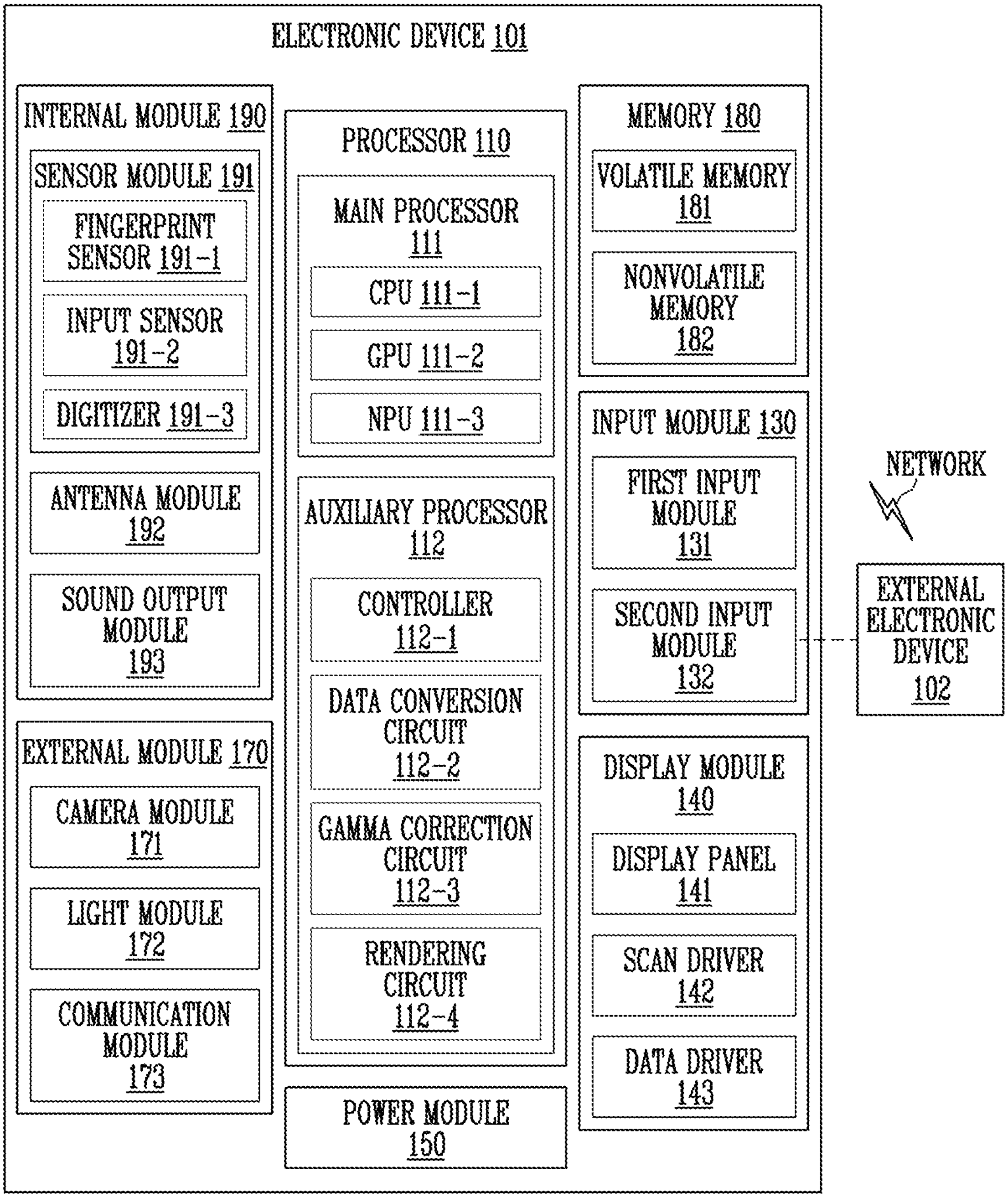
FIG. 8 is a block diagram of an electronic device, according to an embodiment.

FIG. 8 is a block diagram of an electronic device, according to embodiments.

In an embodiment, the electronic device 101 outputs various pieces of information through a display module 140 in an operating system. When a processor 110 executes an application stored in a memory 180, the display module 140 provides application information to a user through a display panel 141.

In an embodiment, the processor 110 obtains an external input through an input module 130 or a sensor module 191 and executes an application corresponding to the external input. For example, when the user selects a camera icon displayed on the display panel 141, the processor 110 obtains a user input through an input sensor 191-2 and activates a camera module 171. The processor 110 transmits image data corresponding to a captured image obtained through the camera module 171 to the display module 140. The display module 140 may display an image corresponding to the captured image through the display panel 141. As another embodiment, when personal information authentication is executed in the display module 140, a fingerprint sensor 191-1 obtains input fingerprint information as input data. The processor 110 compares input data obtained through the fingerprint sensor 191-1 with authentication data stored in the memory 180 and executes an application according to a comparison result. The display module 140 may display information executed according to a logic of the application through the display panel 141.

As still another embodiment, when a music streaming icon displayed on the display module 140 is selected, the processor 110 obtains a user input through the input sensor 191-2 and activates a music streaming application stored in the memory 180. When a music execution command is input in the music streaming application, the processor 110 activates a sound output module 193 to provide sound information corresponding to the music execution command to the user.

In an embodiment, an operation of the electronic device 101 is briefly described. Hereinafter, a configuration of the electronic device 101 is described in detail. Some of configurations of the electronic device 101 to be described later may be integrated and provided as one configuration, and one configuration may be separated into two or more configurations and provided.

In an embodiment and referring to FIG. 8, the electronic device 101 may communicate with an external electronic device 102 through a network (for example, a short-range wireless communication network or a long-range wireless communication network). According to an embodiment, the electronic device 101 may include the processor 110, the memory 180, the input module 130, the display module 140, a power module 150, an internal module 190, and an external module 170. According to an embodiment, in the electronic device 101, at least one of the above described components may be omitted or one or more other components may be added.

According to an embodiment, some of the above described components (for example, the sensor module 191, an antenna module 192, or the sound output module 193) may be integrated into another component (for example, the display module 140).

In an embodiment, the processor 110 may execute software to control at least another component (for example, a hardware or software component) of the electronic device 101 connected to the processor 110, and perform various data processing or operations. The processor 110 or a main processor 111 may correspond to the processor 9 of FIG. 1A. According to an embodiment, as at least a portion of the data processing or operation, the processor 110 may store a command or data received from another component (for example, the input module 130, the sensor module 191, or a communication module 173) in a volatile memory 181 and process the command or the data stored in the volatile memory 181, and result data may be stored in a nonvolatile memory 182.

In an embodiment, the processor 110 may include the main processor 111 and an auxiliary processor 112. The main processor 111 may include one or more of a central processing unit (CPU) 111-1 or an application processor (AP). The main processor 111 may further include any one or more of a graphic processing unit (GPU) 111-2, a communication processor (CP), and an image signal processor (ISP). The main processor 111 may further include a neural processing unit (NPU) 111-3. The NPU is a processor specialized in processing an artificial intelligence model, and the artificial intelligence model may be generated through machine learning. The artificial intelligence model may include a plurality of artificial neural network layers. The artificial neural network may be one of a deep neural network (DNN), a convolutional neural network (CNN), a recurrent neural network (RNN), a restricted boltzmann machine (RBM), a deep belief network (DBN), a bidirectional recurrent deep neural network (BRDNN), a deep Q-network, or a combination of two or more of the above, but is not limited to the above-described example. Additionally or alternatively, the artificial intelligence model may include a software structure in addition to a hardware structure. At least two of the above-described processing units and processors may be implemented as one integrated configuration (for example, a single chip), or each may be implemented as an independent configuration (for example, a plurality of chips).

In an embodiment, the auxiliary processor 112 may include a controller 112-1. The auxiliary processor 112 or the controller 112-1 may correspond to the controller 11 of FIG. 1A. The controller 112-1 may include an interface conversion circuit and a timing control circuit. The controller 112-1 receives an image signal from the main processor 111, converts a data format of the image signal to correspond to an interface specification with the display module 140, and outputs image data. The controller 112-1 may output various control signals necessary for driving the display module 140.

In an embodiment, the auxiliary processor 112 may further include a data conversion circuit 112-2, a gamma correction circuit 112-3, a rendering circuit 112-4, and the like. The data conversion circuit 112-2 may receive the image data from the controller 112-1, compensate the image data to display an image with a desired luminance according to a characteristic of the electronic device 101, a setting of the user, or the like, or convert the image data for reduction of power consumption, afterimage compensation, or the like. The gamma correction circuit 112-3 may convert the image data, a gamma reference voltage, or the like so that the image displayed on the electronic device 101 has a desired gamma characteristic. The rendering circuit 112-4 may receive the image data from the controller 112-1 and render the image data in consideration of a pixel disposition or the like of the display panel 141 applied to the electronic device 101. At least one of the data conversion circuit 112-2, the gamma correction circuit 112-3, and the rendering circuit 112-4 may be integrated into another component (for example, the main processor 111 or the controller 112-1). At least one of the data conversion circuit 112-2, the gamma correction circuit 112-3, and the rendering circuit 112-4 may be integrated into a data driver 143 to be described later.

In an embodiment, the memory 180 may store various data used by at least one component (for example, the processor 110 or the sensor module 191) of the electronic device 101, and input data or output data for a command related thereto. The memory 180 may correspond to the memory 8 of FIG. 1A. The memory 180 may include at least one of the volatile memory 181 and the nonvolatile memory 182.

In an embodiment, the input module 130 may receive a command or data to be used by a component (for example, the processor 110, the sensor module 191, or the sound output module 193) of the electronic device 101 from an outside (for example, the user or the external electronic device 102) of the electronic device 101.

The input module 130 may include a first input module 131 to which a command or data is input from the user and a second input module 132 to which a command or data is input from the external electronic device 102. The first input module 131 may include a microphone, a mouse, a keyboard, a key (for example, a button), or a pen (for example, a passive pen or an active pen). The second input module 132 may support a designated protocol capable of connecting to the external electronic device 102 by wire or wirelessly. According to an embodiment, the second input module 132 may include a high definition multimedia interface (HDMI), a universal serial bus (USB) interface, an SD card interface, or an audio interface. The second input module 132 may include a connector capable of physically connecting to the external electronic device 102, for example, an HDMI connector, a USB connector, an SD card connector, or an audio connector (for example, a headphone connector).

In an embodiment, the display module 140 visually provides information to the user. The display module 140 may include the display panel 141, a scan driver 142, and the data driver 143. The display module 140 may further include a window, a chassis, and a bracket for protecting the display panel 141.

In an embodiment, the display panel 141 may include a liquid crystal display panel, an organic light emitting display panel, or an inorganic light emitting display panel, and a type of the display panel 141 is not particularly limited. The display panel 141 may be a rigid type or a flexible type that may be rolled or folded. The display module 140 may further include a supporter, a bracket, a heat dissipation member, or the like that supports the display panel 141. The display panel 141 may correspond to the pixel unit 14 of FIG. 1A.

In an embodiment, the scan driver 142 may be mounted on the display panel 141 as a driving chip. In addition, the scan driver 142 may be integrated in the display panel 141. The scan driver 142 may correspond to the scan driver 13 of FIG. 1. For example, the scan driver 142 may include an amorphous silicon TFT gate driver circuit (ASG), a low temperature polycrystalline silicon (LTPS) TFT gate driver circuit, or an oxide semiconductor TFT gate driver circuit (OSG) built in the display panel 141. The scan driver 142 receives a control signal from the controller 112-1 and outputs the scan signals to the display panel 141 in response to the control signal.

In an embodiment, the display panel 141 may further include an emission driver. The emission driver outputs an emission control signal to the display panel 141 in response to the control signal received from the controller 112-1. The emission driver may be formed separately from the scan driver 142 or integrated into the scan driver 142. The emission driver may correspond to the emission driver 15 of FIG. 1A.

In an embodiment, the data driver 143 receives the control signal from the controller 112-1, converts image data into an analog voltage (for example, a data voltage) in response to the control signal, and then outputs the data voltages to the display panel 141. The data driver 143 may correspond to a portion of the controller 11 of FIG. 1A.

In an embodiment, the data driver 143 may be integrated into another component (for example, the controller 112-1). A function of the interface conversion circuit and the timing control circuit of the controller 112-1 described above may be integrated into the data driver 143.

In an embodiment, the display module 140 may further include the emission driver, a voltage generation circuit, and the like. The voltage generation circuit may output various voltages necessary for driving the display panel 141.

In an embodiment, the power module 150 supplies power to a component of the electronic device 101. The power module 150 may include a battery that charges a power voltage. The battery may include a non-rechargeable primary cell, and a rechargeable secondary cell or fuel cell. The power module 150 may include a power management integrated circuit (PMIC). The PMIC supplies optimized power to each of the above-described module and a module to be described later. The power module 150 may include a wireless power transmission/reception member electrically connected to the battery. The wireless power transmission/reception member may include a plurality of antenna radiators of a coil form.

In an embodiment, the electronic device 101 may further include the internal module 190 and the external module 170. The internal module 190 may include the sensor module 191, the antenna module 192, and the sound output module 193. The external module 170 may include the camera module 171, a light module 172, and the communication module 173.

In an embodiment, the sensor module 191 may sense an input by a body of the user or an input by a pen among the first input module 131, and may generate an electrical signal or a data value corresponding to the input. The sensor module 191 may include at least one of the fingerprint sensor 191-1, the input sensor 191-2, and a digitizer 191-3.

In an embodiment, the fingerprint sensor 191-1 may generate a data value corresponding to a fingerprint of the user. The fingerprint sensor 191-1 may include any one of an optical type fingerprint sensor or a capacitive type fingerprint sensor.

In an embodiment, the input sensor 191-2 may generate a data value corresponding to coordinate information of the input by the body of the user or the pen. The input sensor 191-2 generates a capacitance change amount by the input as the data value. The input sensor 191-2 may sense an input by the passive pen or may transmit/receive data to and from the active pen.

In an embodiment, the input sensor 191-2 may measure a biometric signal such as blood pressure, water, or body fat. For example, when the user touches a sensor layer or a sensing panel with a body part and does not move during a certain time, the input sensor 191-2 may sense the biometric signal based on a change of an electric field by the body part and output information desired by the user to the display module 140.

In an embodiment, the digitizer 191-3 may generate a data value corresponding to coordinate information input by a pen. The digitizer 191-3 generates an electromagnetic change amount by an input as the data value. The digitizer 191-3 may sense an input by a passive pen or transmit or receive data to or from the active pen.

In an embodiment, at least one of the fingerprint sensor 191-1, the input sensor 191-2, and the digitizer 191-3 may be implemented as a sensor layer formed on the display panel 141 through a successive process. The fingerprint sensor 191-1, the input sensor 191-2, and the digitizer 191-3 may be disposed on the display panel 141, and any one of the fingerprint sensor 191-1, the input sensor 191-3, and the digitizer 191-3, for example, the digitizer 191-3 may be disposed under the display panel 141.

In an embodiment, at least two of the fingerprint sensor 191-1, the input sensor 191-2, and the digitizer 191-3 may be formed to be integrated into one sensing panel through the same process. When at least two of the fingerprint sensor 191-1, the photo sensor (not shown), and the input sensor 191-2 are integrated into one sensing panel, the sensing panel may be disposed between the display panel 141 and a window disposed above the display panel 141. According to an embodiment, the sensing panel may be disposed on the window, and a position of the sensing panel is not particularly limited.

In an embodiment, at least one of the fingerprint sensor 191-1, the input sensor 191-2, and the digitizer 191-3 may be embedded in the display panel 141. That is, at least one of the fingerprint sensor 191-1, the input sensor 191-2, and the digitizer 191-3 may be simultaneously formed through a process of forming elements (for example, a light emitting element, a transistor, and the like) included in the display panel 141.

In an embodiment, the sensor module 191 may generate an electrical signal or a data value corresponding to an internal state or an external state of the electronic device 101. The sensor module 191 may further include, for example, a gesture sensor, a gyro sensor, a barometric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

In an embodiment, the antenna module 192 may include one or more antennas for transmitting a signal or power to an outside or receiving a signal or power from an outside. According to an embodiment, the communication module 173 may transmit a signal to an external electronic device or receive a signal from an external electronic device through an antenna suitable for a communication method. An antenna pattern of the antenna module 192 may be integrated into one configuration (for example, the display panel 141) of the display module 140 or the input sensor 191-2.

In an embodiment, the sound output module 193 is a device for outputting a sound signal to an outside of the electronic device 101, and may include, for example, a speaker used for general purposes such as multimedia playback or recording playback, and a receiver used exclusively for receiving a call. According to an embodiment, the receiver may be formed integrally with or separately from the speaker. A sound output pattern of the sound output module 193 may be integrated into the display module 140.

In an embodiment, the camera module 171 may capture a still image and a moving image. According to an embodiment, the camera module 171 may include one or more lenses, an image sensor, or an image signal processor. The camera module 171 may further include an infrared camera capable of measuring presence or absence of the user, a position of the user, a gaze of the user, and the like.

In an embodiment, the light module 172 may provide light. The light module 172 may include a light emitting diode or a xenon lamp. The light module 172 may operate in conjunction with the camera module 171 or may operate independently.

In an embodiment, the communication module 173 may support establishment of a wired or wireless communication channel between the electronic device 101 and the external electronic device 102 and communication performance through the established communication channel. The communication module 173 may include any one or both of a wireless communication module such as a cellular communication module, a short-range wireless communication module, or a global navigation satellite system (GNSS) communication module, and a wired communication module such as a local area network (LAN) communication module or a power line communication module. The communication module 173 may communicate with the external electronic device 102 through a short-range communication network such as Bluetooth, WiFi direct, or infrared data association (IrDA), or a long-range communication network such as a cellular network, the Internet, or a computer network (for example, LAN or WAN). The above-described various types of communication modules 1173 may be implemented as a single chip or as separate chips.

In an embodiment, the input module 130, the sensor module 191, the camera module 171, and the like may be used to control an operation of the display module 140 in conjunction with the processor 110.

In an embodiment, the processor 110 outputs a command or data to the display module 140, the sound output module 193, the camera module 171, or the light module 172 based on input data received from the input module 130. For example, the processor 110 may generate image data in response to the input data applied through a mouse, an active pen, or the like and output the image data to the display module 140, or generate command data in response to the input data and output the command data to the camera module 171 or the light module 172. When the input data is not received from the input module 130 during a certain time, the processor 110 may convert an operation mode of the electronic device 101 to a low power mode or a sleep mode to reduce power consumed in the electronic device 101.

In an embodiment, the processor 110 outputs a command or data to the display module 140, the sound output module 193, the camera module 171, or the light module 172 based on sensing data received from the sensor module 191. For example, the processor 110 may compare authentication data applied by the fingerprint sensor 191-1 with authentication data stored in the memory 180 and then execute an application according to a comparison result. The processor 110 may execute the command based on sensing data sensed by the input sensor 191-2 or the digitizer 191-3, or output corresponding image data to the display module 140. When the sensor module 191 includes a temperature sensor, the processor 110 may receive temperature data for a measured temperature from the sensor module 191 and further perform luminance correction or the like on the image data based on the temperature data.

In an embodiment, the processor 110 may receive measurement data for the presence of the user, the position of the user, the gaze of the user, and the like, from the camera module 171. The processor 110 may further perform luminance correction or the like on the image data based on the measurement data. For example, the processor 110 determining the presence or absence of the user through an input from the camera module 171 may output image data of which a luminance is corrected through the data conversion circuit 112-2 or the gamma correction circuit 112-3 to the display module 140.

In an embodiment, some of the above-described components may be connected to each other through a communication method between peripheral devices, for example, a bus, general purpose input/output (GPIO), a serial peripheral interface (SPI), a mobile industry processor interface (MIPI), or an ultra path interconnect (UPI) link to exchange a signal (for example, a command or data) with each other. The processor 110 may communicate with the display module 140 through a mutually agreed interface, for example, may use any one of the above described communication methods, and is not limited to the above described communication method.

The electronic device 101 according to various embodiments may be various types of devices. The electronic device 101 may include, for example, at least one of a portable communication device (for example, a smart phone), a computer device, a portable multimedia device, a portable medical device, a camera, a wearable device, or a home appliance. The electronic device 101 is not limited to the above-described devices.

While the invention has been particularly shown and described with reference to embodiments thereof, it will be understood by those of ordinary skill in the art that various changes in form and details may be made therein without departing from the spirit or scope of the invention. Therefore, it is to be understood that the foregoing is illustrative of various embodiments and is not to be construed as limited to the specific embodiments disclosed, and that modifications to the invention, are intended to be included within the scope of the invention. Moreover, the embodiments or parts of the embodiments may be combined in whole or in part without departing from the scope of the invention.

What is claimed is:

1. A controller comprising:

a reception interface configured to receive first frame data and a first vertical synchronization packet; and a transmission interface configured to transmit a first frame request signal, wherein when a first period from a time point when the reception interface completes reception of the first frame data to a time point when the reception interface starts reception of the first vertical synchronization packet is longer than a first reference period, the transmission interface transmits the first frame request signal.

2. The controller according to claim 1, wherein the first frame request signal is transmitted after a time point when reception of second frame data is completed.

3. The controller according to claim 2, wherein the first frame data and the second frame data are different image data.

4. The controller according to claim 2, wherein when the first frame request signal is transmitted, a second vertical synchronization packet is received.

5. The controller according to claim 4, wherein third frame data is received after receiving the second vertical synchronization packet, and wherein the third frame data and the second frame data are the same image data.

6. The controller according to claim 5, wherein a second frame request signal is transmitted after a time point when reception of the third frame data is completed.

7. The controller according to claim 6, wherein a second period from a time point when reception of the second frame data is completed to a time point when reception of the second vertical synchronization packet is started is shorter than the first period.

8. The controller according to claim 7, wherein a third period from a time point when reception of the third frame data is completed to a time point when reception of a third vertical synchronization packet is started is equal to the second period.

9. The controller according to claim 1, wherein when the first period is shorter than the first reference period and longer than a second reference period, the reception interface further receives a plurality of frame data, and when the first period is shorter than the first reference period and a number of frames longer than the second reference period matches a number of reference frames, the transmission interface transmits the first frame request signal after a time point when reception of second frame data, which is a last of the plurality of frame data, is completed.

10. The controller according to claim 9, wherein the plurality of frame data are different image data.

11. The controller according to claim 9, wherein when the first frame request signal is transmitted, a second vertical synchronization packet is received.

12. The controller according to claim 11, wherein third frame data is received after receiving the second vertical synchronization packet, and the third frame data and the second frame data are the same image data.

13. The controller according to claim 12, wherein a second frame request signal is transmitted after a time point when reception of the third frame data is completed.

14. The controller according to claim 13, wherein a second period from the time point when reception of the second frame data is completed to a time point when reception of the second vertical synchronization packet is started is shorter than the first period.

15. The controller according to claim 14, wherein a third period from the time point when reception of the third frame data is completed to a time point when reception of a third vertical synchronization packet is started is equal to the second period.

16. The controller according to claim 15, further comprising:

a first register storing the first reference period;

a second register storing the second reference period; and a third register storing a number of transmissions of a frame request signal.

17. The controller according to claim 16, wherein the first frame request signal and the second frame request signal are transmitted based on a number of transmissions stored in the third register, wherein the number of transmissions is 2 or more.

18. A method of driving a controller, the method comprising:

receiving first frame data;

receiving a first vertical synchronization packet; and transmitting a first frame request signal when a first period from a time point when reception of the first frame data is completed to a time point when reception of the first vertical synchronization packet is started is longer than a first reference period.

19. The method according to claim 18, wherein the first frame request signal is transmitted after a time point when reception of second frame data is completed.

20. The method according to claim 19, wherein the first frame data and the second frame data are different image data.

21. The method according to claim 19, wherein when the first frame request signal is transmitted, a second vertical synchronization packet is received.

22. The method according to claim 21, wherein third frame data is received after receiving the second vertical synchronization packet, wherein the third frame data and the second frame data are the same image data.

23. The method according to claim 22, wherein a second frame request signal is transmitted after a time point when reception of the third frame data is completed.

24. The method according to claim 23, wherein a second period from the time point when reception of the second frame data is completed to a time point when reception of the second vertical synchronization packet is started is shorter than the first period.

25. The method according to claim 24, wherein a third period from the time point when reception of the third frame data is completed to a time point when reception of a third vertical synchronization packet is started is equal to the second period.

26. The method according to claim 18, wherein when the first period is shorter than the first reference period and longer than a second reference period, a plurality of frame data are further received, and when the first period is shorter than the first reference period and a number of frames longer than the second reference period matches the number of reference frames, the first frame request signal is transmitted after a time point when reception of second frame data, which is a last of the plurality of frame data, is completed.

27. The method according to claim 26, wherein the plurality of frame data are different image data.

28. The method according to claim 26, wherein when the first frame request signal is transmitted, a second vertical synchronization packet is received.

29. The method according to claim 28, wherein third frame data is received after receiving the second vertical synchronization packet, wherein the third frame data and the second frame data are the same image data.

30. The method according to claim 29, wherein a second frame request signal is transmitted after a time point when reception of the third frame data is completed.

31. The method according to claim 30, wherein a second period from a time point when reception of the second frame data is completed to a time point when reception of the second vertical synchronization packet is started is shorter than the first period.

32. The method according to claim 31, wherein a third period from the time point when reception of the third frame data is completed to a time point when reception of a third vertical synchronization packet is started is equal to the second period.

33. A display device comprising:

a processor configured to transmit first frame data and a first vertical synchronization packet;

a controller configured to generate data voltages corresponding to the first frame data; and a pixel unit configured to display an image based on the data voltages, wherein the controller transmits a first frame request signal to the processor when a first period from a time point when reception of the first frame data is completed to a time point when reception of the first vertical synchronization packet is started is longer than a first reference period.

* * * * *